US011205290B2

(12) United States Patent
Deng et al.

(10) Patent No.: US 11,205,290 B2
(45) Date of Patent: Dec. 21, 2021

(54) METHOD AND DEVICE FOR INSERTING AN IMAGE INTO A DETERMINED REGION OF A TARGET EYE IMAGE

(71) Applicant: Beijing Bytedance Network Technology Co., Ltd., Beijing (CN)

(72) Inventors: Han Deng, Beijing (CN); Zhichao Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 16/631,343

(22) PCT Filed: Nov. 19, 2018

(86) PCT No.: PCT/CN2018/116180
§ 371 (c)(1),
(2) Date: Jan. 15, 2020

(87) PCT Pub. No.: WO2020/024485
PCT Pub. Date: Feb. 6, 2020

(65) Prior Publication Data
US 2021/0150787 A1 May 20, 2021

(30) Foreign Application Priority Data
Aug. 3, 2018 (CN) .......................... 201810879255.8

(51) Int. Cl.
*G06T 11/60* (2006.01)
*G06T 3/00* (2006.01)
(Continued)

(52) U.S. Cl.
CPC ................ *G06T 11/60* (2013.01); *G06T 3/00* (2013.01); *G06T 7/60* (2013.01); *G06T 7/74* (2017.01); *G06T 2207/30201* (2013.01)

(58) Field of Classification Search
CPC ... G06T 11/60; G06T 7/11; G06T 7/73; G06T 2207/30201; G06K 9/00912;
(Continued)

(56) References Cited

U.S. PATENT DOCUMENTS

| 2014/0334694 A1 | 11/2014 | Perez Lopez et al. |
| 2016/0157587 A1 | 6/2016 | Yamanashi et al. |

(Continued)

FOREIGN PATENT DOCUMENTS

| CN | 101779218 A | 7/2010 |
| CN | 101789990 A | 7/2010 |

(Continued)

OTHER PUBLICATIONS

International Patent Application No. PCT/CN2018/116180; Int'l Search Report; dated Apr. 30, 2019; 2 pages.

*Primary Examiner* — Jin Cheng Wang
(74) *Attorney, Agent, or Firm* — BakerHostetler

(57) ABSTRACT

A method and device for inserting an image are provided. The method includes: acquiring a target eye image, and determining eye key point data of the target eye image; determining auxiliary key point data of the target eye image based on the eye key point data; performing coordinate transformation on the auxiliary key point data, to obtain transformed auxiliary key point data; and acquiring a to-be-inserted image, and inserting the to-be-inserted image into a region in the target eye image that is characterized by the transformed auxiliary key point data and the eye key point data.

15 Claims, 7 Drawing Sheets

(51) Int. Cl.
*G06T 7/60* (2017.01)
*G06T 7/73* (2017.01)

(58) Field of Classification Search
CPC .......... G06K 9/00228; G06K 9/00248; G06K 9/00281; G06K 9/00604; G06K 9/0061; A54D 2044/007; A54D 2200/1072; A54D 44/00; A54D 44/005
See application file for complete search history.

(56) References Cited

U.S. PATENT DOCUMENTS

| | | | | |
|---|---|---|---|---|
| 2018/0276453 | A1* | 9/2018 | Takei | A45D 44/00 |
| 2019/0059561 | A1* | 2/2019 | Shen | A45D 44/00 |
| 2019/0065830 | A1* | 2/2019 | Shen | G06K 9/00281 |
| 2019/0095696 | A1* | 3/2019 | Shen | G06K 9/52 |
| 2019/0095697 | A1* | 3/2019 | Shen | G06K 9/00248 |
| 2019/0104827 | A1* | 4/2019 | Nishi | G06T 7/00 |

FOREIGN PATENT DOCUMENTS

| | | |
|---|---|---|
| CN | 101826217 A | 9/2010 |
| CN | 101938591 A | 1/2011 |
| CN | 102999929 A | 3/2013 |
| CN | 103325085 A | 9/2013 |
| CN | 104036299 A | 9/2014 |
| CN | 104537630 A | 4/2015 |
| CN | 104778712 A | 7/2015 |
| CN | 105631423 A | 6/2016 |
| CN | 105678252 A | 6/2016 |
| CN | 106210545 A | 12/2016 |
| CN | 106296571 A | 1/2017 |
| CN | 107341435 A | 11/2017 |
| CN | 107343211 A | 11/2017 |
| CN | 107431757 A | 12/2017 |
| CN | 108093156 A | 5/2018 |
| CN | 108171789 A | 6/2018 |
| CN | 108205795 A | 6/2018 |
| CN | 108229293 A | 6/2018 |
| CN | 108292423 A | 7/2018 |
| CN | 108305317 A | 7/2018 |
| WO | WO 2018/012136 A1 | 1/2018 |

\* cited by examiner

METHOD AND DEVICE FOR INSERTING AN IMAGE INTO A DETERMINED REGION OF A TARGET EYE IMAGE

CROSS REFERENCE TO RELATED APPLICATION

The present application is the national phase application of International Patent Application No. PCT/CN2018/116180, filed on Nov. 19, 2018, which claims priority to Chinese Patent Application No. 201810879255.8, titled "METHOD AND DEVICE FOR INSERTING IMAGE," filed on Aug. 3, 2018, both of which are incorporated herein by reference in their entireties.

FIELD

The present disclosure relates to the field of computer technology, and in particular to a method and device for inserting an image.

BACKGROUND

With the development of the image processing technologies, the eye key point detecting technology is widely used. For example, the eye key point detecting technology may be applied to fields such as addition of a special effect to an eye image, determination of a shape of an eye, and the like.

An eye key point refers to a point in an eye image for characterizing a specific location, such as a point for characterizing a location of a canthus, a point for characterizing a location at an edge of an eyelid. At present, some material images (such as an eyelash image, an eye makeup image) may be inserted into the eye image based on a location of the eye key point in the eye image.

SUMMARY

A method and device for inserting an image are provided according to embodiments of the present disclosure.

In a first aspect, a method for inserting an image is provided according to an embodiment of the present disclosure. The method includes: acquiring a target eye image, and determining eye key point data of the target eye image, where the eye key point data characterizes a location of an eye key point of the target eye image in the target eye image; determining auxiliary key point data of the target eye image based on the eye key point data, where the auxiliary key point data characterizes a location of an auxiliary key point of the target eye image in the target eye image; performing coordinate transformation on the auxiliary key point data, to obtain transformed auxiliary key point data; and acquiring a to-be-inserted image, and inserting the to-be-inserted image into a region in the target eye image that is characterized by the transformed auxiliary key point data and the eye key point data.

In some embodiments, before the determining auxiliary key point data of the target eye image based on the eye key point data, the method further includes: acquiring preset reference eye key point data and reference auxiliary key point data, where the reference eye key point data characterizes a location of an eye key point of a reference eye image preset in the reference eye image, and the reference auxiliary key point data characterizes a location of a reference auxiliary key point preset in the reference eye image.

In some embodiments, the determining auxiliary key point data of the target eye image based on the eye key point data includes: constructing a first triangulation mesh based on the reference auxiliary key point data and the reference eye key point data; determining a second triangulation mesh on the target eye image based on a side length and an inner angle of a triangle in the first triangulation mesh and a correspondence between the eye key point data of the target eye image and the reference eye key point data; and determining a target vertex from vertexes of a triangle in the second triangulation mesh, and determining the auxiliary key point data of the target eye image based on a location of the target vertex in the target eye image.

In some embodiments, the performing coordinate transformation on the auxiliary key point data, to obtain transformed auxiliary key point data includes: performing coordinate transformation on the reference auxiliary key point data, to obtain transformed reference auxiliary key point data; and inputting the reference auxiliary key point data, the transformed reference auxiliary key point data, and the auxiliary key point data of the target eye image into a preset coordinate mapping model, to obtain the transformed auxiliary key point data of the target eye image.

In some embodiments, the performing coordinate transformation on the reference auxiliary key point data, to obtain transformed reference auxiliary key point data includes: determining, based on the eye key point data of the target eye image, an opening degree value for characterizing an opening degree of an eye indicated by the target eye image; determining, based on a preset radians calculating equation and an abscissa in the reference auxiliary key point data, a radians value for characterizing a change amount of a coordinate in the reference auxiliary key point data; and determining, based on the radians value and the opening degree value, the transformed reference auxiliary key point data.

In some embodiments, the coordinate mapping model is constructed based on a moving least squares MLS method.

In some embodiments, the acquiring a to-be-inserted image includes: acquiring a preset image; and deforming the preset image based on the eye key point data and the transformed auxiliary key point data, and determining the deformed preset image as the to-be-inserted image.

In a second aspect, a device for inserting an image is further provided according to an embodiment of the present disclosure. The device includes a first acquiring unit, a determining unit, a transforming unit and an inserting unit. The first acquiring unit is configured to acquire a target eye image, and determine eye key point data of the target eye image, where the eye key point data characterizes a location of an eye key point of the target eye image in the target eye image. The determining unit is configured to determine auxiliary key point data of the target eye image based on the eye key point data, where the auxiliary key point data characterizes a location of an auxiliary key point of the target eye image in the target eye image. The transforming unit is configured to perform coordinate transformation on the auxiliary key point data, to obtain transformed auxiliary key point data. The inserting unit is configured to acquire a to-be-inserted image, and insert the to-be-inserted image into a region in the target eye image that is characterized by the transformed auxiliary key point data and the eye key point data.

In some embodiments, the device further includes a second acquiring unit. The second acquiring unit is configured to acquire preset reference eye key point data and reference auxiliary key point data, where the reference eye key point data characterizes a location of an eye key point of a reference eye image preset in the reference eye image, and the reference auxiliary key point data characterizes a location of a reference auxiliary key point preset in the reference eye image.

In some embodiments, the determining unit includes a constructing module, a first determining module, and a second determining module. The constructing module is configured to construct a first triangulation mesh based on the reference auxiliary key point data and the reference eye key point data. The first determining module is configured to determine a second triangulation mesh on the target eye image based on a side length and an inner angle of a triangle in the first triangulation mesh and a correspondence between the eye key point data of the target eye image and the reference eye key point data. The second determining module is configured to determine a target vertex from vertexes of a triangle in the second triangulation mesh, and determine the auxiliary key point data of the target eye image based on a location of the target vertex in the target eye image.

In some embodiments, the transforming unit includes a transforming module and a generating module. The transforming module is configured to perform coordinate transformation on the reference auxiliary key point data, to obtain transformed reference auxiliary key point data. The generating module is configured to input the reference auxiliary key point data, the transformed reference auxiliary key point data, and the auxiliary key point data of the target eye image into a preset coordinate mapping model, to obtain the transformed auxiliary key point data of the target eye image.

In some embodiments, the transforming module includes a first determining submodule, a second determining submodule and a third determining submodule. The first determining submodule is configured to determine, based on the eye key point data of the target eye image, an opening degree value for characterizing an opening degree of an eye indicated by the target eye image. The second determining submodule is configured to determine, based on a preset radians calculating equation and an abscissa in the reference auxiliary key point data, a radians value for characterizing a change amount of a coordinate in the reference auxiliary key point data. The third determining submodule is configured to determine, based on the radians value and the opening degree value, the transformed reference auxiliary key point data.

In some embodiments, the coordinate mapping model is constructed based on a moving least squares MLS method.

In some embodiments, the inserting unit includes an acquiring module and a deforming module. The acquiring module is configured to acquire a preset image. The deforming module is configured to deform the preset image based on the eye key point data and the transformed auxiliary key point data, and determine the deformed preset image as the to-be-inserted image.

In a third aspect, an electronic device is further provided according to an embodiment of the present disclosure. The electronic device includes: one or more processors; and a storage device configured to store one or more programs thereon. The one or more programs, when executed by the one or more processors, cause the one or more processors to perform the method according to any one of the embodiments in the first aspect.

In a fourth aspect, a computer readable medium is further provided according to an embodiment of the present disclosure. The computer readable medium includes a computer program thereon. The computer program, when executed by a processor, causes the processor to perform the method according to any one of the embodiments in the first aspect.

With the method and device for inserting an image according to the embodiments of the present disclosure, the eye key point data of the acquired target eye image is determined, the auxiliary key point data of the target eye image is determined based on the eye key point data, and coordinate transformation is performed on the auxiliary key point data to obtain the transformed auxiliary key point data, finally, the preset image is deformed based on the transformed auxiliary key point data, and the deformed preset image is inserted into a corresponding location in the target eye image. Therefore, the flexibility of inserting a preset image into an eye image is improved, which enriches the display form of the preset image inserted into the eye image.

BRIEF DESCRIPTION OF THE DRAWINGS

Other features, objects, and advantages of the present disclosure will become more apparent from the following detailed description of the non-limited embodiments made with reference to the drawings.

DETAILED DESCRIPTION OF EMBODIMENTS

Figure 1:
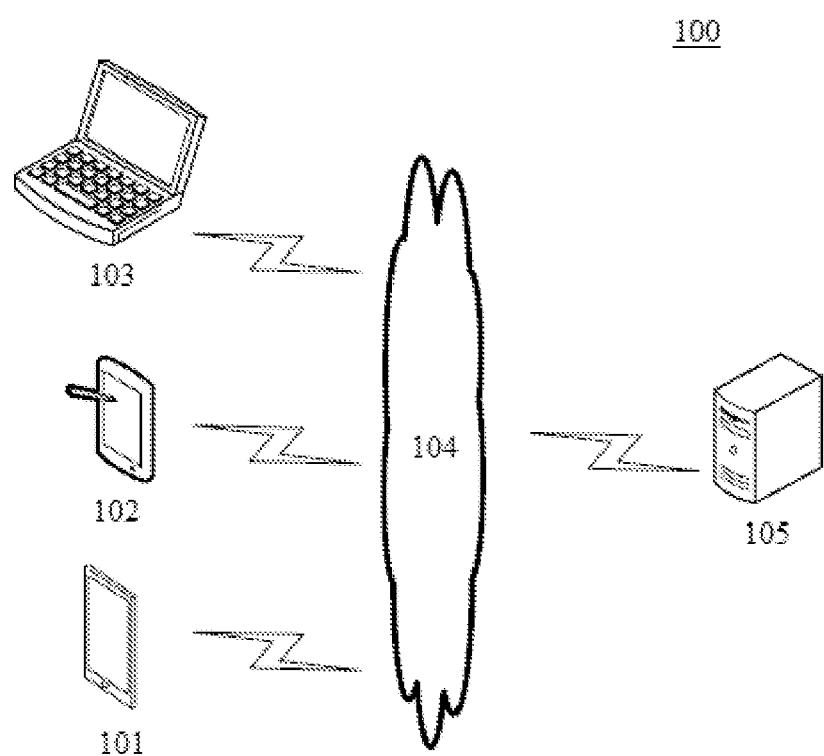
FIG. 1 is a schematic diagram of an exemplary system architecture to which an embodiment of the present disclosure may be applied.

The present disclosure will be further described in detail below with reference to the drawings and in combination with the embodiments. It is to be understood that the specific embodiments described herein are merely illustrative of the present disclosure, rather than limiting the present disclosure. It is also to be noted that, for convenience of description, only parts related to the present disclosure are shown in the drawings.

It is to be noted that the embodiments in the present disclosure and the features in the embodiments may be combined with each other without conflict. The present disclosure will be described in detail below with reference to the drawings.

FIG. 1 shows an exemplary system architecture 100 to which a method for inserting an image or a device for inserting an image according to embodiments of the present disclosure may be applied.

As shown in FIG. 1, the system architecture 100 may include terminal devices 101, 102, 103, a network 104, and a server 105. The network 104 is configured to provide a medium for communication links between the server 105 and the terminal devices 101, 102, 103. The network 104 may have various connection manners, such as wired, wireless communication links, fiber optic cables, and the like.

A user may interact with the server 105 via the network 104 by using the terminal devices 101, 102, 103, to receive or transmit messages and the like. The terminal devices 101, 102, and 103 may be installed with various applications, such as an image processing application, a video playing application, an instant communication tool, and a social platform software.

The terminal devices 101, 102, 103 may be implemented by hardware or software. In a case that the terminal devices 101, 102, 103 are implemented by hardware, the terminal devices 101, 102, 103 may be various electronic devices having a display screen and supporting image display, including but not limited to smart phones, tablets, e-book readers, moving picture experts group audio layer III (MP3) players, moving picture experts group audio layer IV (MP4) players, laptop portable computers and desktop computers. In a case that the terminal devices 101, 102, 103 are implemented by software, the terminal devices 101, 102, 103 may be installed in the above-listed electronic devices. The terminal devices 101, 102, 103 may be implemented as multiple software or software modules (for example, software or software modules for providing distributed services), or implemented as a single software or software module, which is not specifically limited herein.

The server 105 may be a server that provides various services, for example, a background image processing server that provides support for images displayed on the terminal devices 101, 102, 103. The background image processing server may process an acquired eye image and obtain a processing result (for example, an eye image into which a preset image is inserted).

It is to be noted that the method for inserting an image according to the embodiment of the present disclosure may be performed either by the server 105 or by the terminal device 101, 102, 103. Accordingly, the device for inserting an image may be arranged either in the server 105, or in the terminal devices 101, 102, 103.

It is to be noted that the server may be implemented by hardware or software. In a case that the server is implemented by hardware, the server may be implemented as a distributed server cluster including multiple servers, or as a single server. In a case that the server is implemented by software, the server may be implemented as multiple software or software modules (for example, software or software modules for providing distributed services), or as a single software or software module, which is not specifically limited herein.

It is to be understood that the number of the terminal devices, the network, and the server shown in FIG. 1 is merely illustrative, and there may be any number of terminal devices, networks, and servers according to actual needs. In a case that it is not required to acquire a target eye image and a preset image remotely, the above system architecture may not include the network, but only include the terminal devices or the server.

Figure 2:
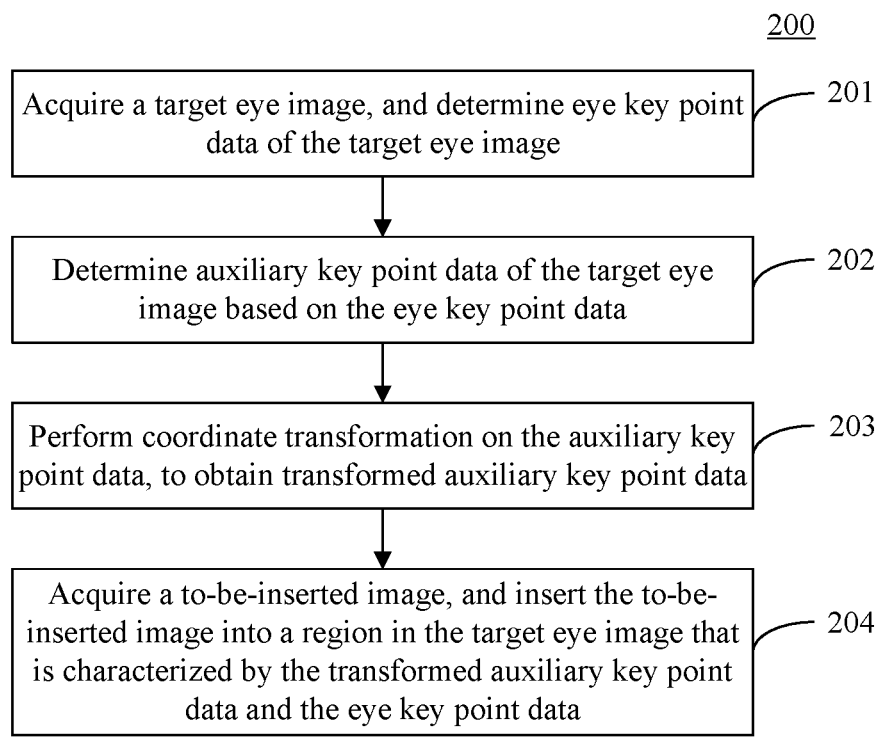
FIG. 2 is a flow chart of a method for inserting an image according to an embodiment of the present disclosure.

Reference is made to FIG. 2, which shows a flow 200 of a method for inserting an image according to an embodiment of the present disclosure. The method for inserting an image includes the following steps 201 to 204.

In step 201, a target eye image is acquired, and eye key point data of the target eye image is determined.

In the embodiment, an execution body (for example, the server or the terminal devices shown in FIG. 1) of the method for inserting an image may first acquire the target eye image remotely or locally in a wired connection manner or a wireless connection manner. The target eye image may be an image including an eye image of a target person (for example, the user or another person who uses the terminal device as shown in FIG. 1). For example, the target eye image may be an image obtained by capturing an eye of a target person, or may be an eye image extracted from a face image for characterizing the face of the target person. It is to be noted that the target eye image may be a single image, or an eye image in an image frame extracted from a target video. For example, the target eye image may be an eye image in a currently displayed image frame in a video played by the execution body.

Then, the execution body may determine the eye key point data of the target eye image. The eye key point data is used to characterize a location of an eye key point of the target eye image in the target eye image. Generally, the eye key point data may include a coordinate in a coordinate system established in advance in the target eye image, and the location of the eye key point may be determined in the target eye image based on the coordinate. The eye key point may be a point for characterizing a specific location in the eye image (for example, a point for characterizing a canthus, a point for characterizing an edge of an eyelid).

In the embodiment, the execution body may determine the eye key point data of the target eye image with various conventional methods for determining an eye key point.

For example, the execution body may input the target eye image into a pre-trained eye key point extracting model to obtain the eye key point data. The eye key point extracting model may be used to characterize a correspondence between the eye image and the eye key point data. For example, in a case that the target eye image is an eye image in a face image, the execution body may input the face image into a pre-trained face key point extracting model to obtain face key point data. The face key point extracting model may be used to characterizing a correspondence between the face image and the face key point data. The execution body may further extract, from the obtained face key point data, face key point data for characterizing an eye as the eye key point data. It is to be noted that the eye key point extracting model or the face key point extracting model may be obtained by training an initial model (such as a convolutional neural network (CNN), an active shape model (ASM)) based on training samples (for example, the training samples may include a sample eye images and marked eye key point data obtained by marking eye key points of the sample eye images), with a machine learning method (for example, training is performed by taking the sample eye images as an input to the initial model, and taking the marked eye key point data as an expected output from the initial model). It is to be understood that the method of acquiring the eye key point extracting model by training is a well-known technique that has been widely studied and applied at present, and is not described herein.

In step 202, auxiliary key point data of the target eye image is determined based on the eye key point data.

In the embodiment, the execution body may determine the auxiliary key point data of the target eye image based on the eye key point data determined in step 201. The auxiliary key point data is used to characterize a location of an auxiliary key point of the target eye image in the target eye image. The auxiliary key point may be a key point added in the target eye image by the execution body for characterizing, in combination with the eye key point data, a region in the target eye image into which another image is inserted.

Specifically, the execution body may determine the auxiliary key point data of the target eye image with various methods. For example, the execution body may add the auxiliary key point within a preset range (for example, a range determined by a preset distance above an eye key point for characterizing an edge of an upper eyelid and an eye key point for characterizing a canthus) of the target eye image based on data preset by a technician, and determine the auxiliary key point data. The preset data includes, but is not limited to, at least one of a distance between auxiliary key points, a distance between the auxiliary key point and the eye key point.

In some alternative implementations of the embodiment, before performing step 202, the execution body may further acquire preset reference eye key point data and reference auxiliary key point data. The reference eye key point data is used to characterize a location of an eye key point of a reference eye image preset in the reference eye image, and the reference auxiliary key point data is used to characterize a location of a reference auxiliary key point preset in the reference eye image. The reference eye image may be an eye image preset by a technician, and the eye image may be used as a template, and the reference eye key point and the reference auxiliary key point of the eye image may be used as reference key points for determining the auxiliary key point of the target eye image. Specifically, the reference eye key point data may be eye key point data of the reference eye image determined with the eye key point extracting model listed in step 201. The auxiliary key point characterized by the reference auxiliary key point data may be a point manually set by the technician, or a point set by the execution body based on a preset distance between the auxiliary key points and/or a preset distance between the auxiliary key point and the reference eye key point.

In some alternative implementations of the embodiment, the execution body may determine the auxiliary key point data of the target eye image according to the following steps.

First, a first triangulation mesh is constructed based on the reference auxiliary key point data and the reference eye key point data. A triangulation mesh indicates a mesh including multiple triangles which is formed by performing triangulation on multiple points with a triangulation algorithm. In this implementation, the reference auxiliary key point characterized by the reference auxiliary key point data and the reference eye key point characterized by the reference eye key point data are vertexes of triangles in the first triangulation mesh.

Then, a second triangulation mesh is determined on the target eye image based on a side length and an inner angle of a triangle in the first triangulation mesh and a correspondence between the eye key point data of the target eye image and the reference eye key point data. Specifically, the execution body may determine a distance between eye key points in the target eye image, and determine a triangle in the target eye image according to the similar triangle principle based on a corresponding triangle among the triangles in the first triangulation mesh which is formed by two reference eye key points and a reference auxiliary key point, and then determines each determined triangle as a triangle in the second triangulation mesh. It is to be noted that the triangle determined in the target eye image may not be completely similar to a corresponding triangle in the first triangulation mesh, that is, an angle difference between an inner angle of the triangle determined in the target eye image and an inner angle of a corresponding triangle included in the first triangulation mesh may be within a preset range.

Figure 3A:
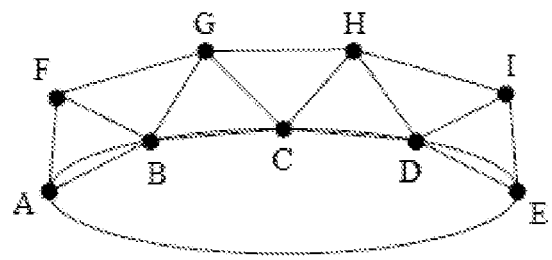
FIG. 3A is an exemplary schematic diagram of a first triangulation mesh with a method for inserting an image according to an embodiment of the present disclosure.
Figure 3B:
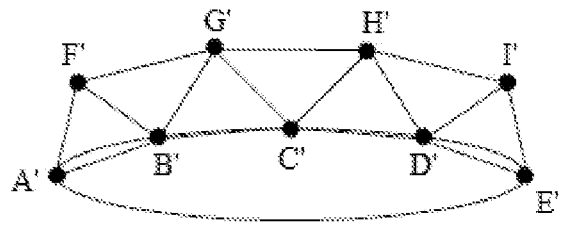
FIG. 3B is an exemplary schematic diagram of a second triangulation mesh with a method for inserting an image according to an embodiment of the present disclosure.

As an example, reference is made to FIG. 3A, which shows a schematic diagram of the first triangulation mesh, where points A, B, C, D, and E indicate reference eye key points, and points F, H, I indicate reference auxiliary key points. Reference is made to FIG. 3B, which shows a schematic diagram of the second triangulation mesh, where points A', B', C', D', E' indicate eye key points of the target eye image, and points F', G', H', I' indicate auxiliary key points of the target eye image. In FIG. 3A, for a triangle ABF, a length of a side AB and angles of three vertexes are known, since a length between the points A' and B' as shown in FIG. 3B may be calculated, a triangle A'B'F' similar to the triangle ABF may be determined in the target eye image. With the same method, a triangle BCG, a triangle CDH, and a triangle DEI may be obtained, thereby obtaining the second triangulation mesh as shown in FIG. 3B.

It is to be noted that, in practice, the number of eye key points and auxiliary key points of the target eye image is not limited to the number listed in the above example, and the execution body may determine the second triangulation mesh based on the first triangulation mesh according to the similar triangle principle.

Finally, the auxiliary key point is determined from vertexes of a triangle in the second triangulation mesh, and the auxiliary key data of the target eye image is obtained. Specifically, the auxiliary key point data may include a coordinate of the auxiliary key point, and the execution body may determine another vertex other than the eye key point from the vertexes of the triangle in the second triangulation mesh as the auxiliary key point, and determine a coordinate of the auxiliary key point in the target eye image as the coordinate of the auxiliary key point.

In step 203, coordinate transformation is performed on the auxiliary key point data to obtain transformed auxiliary key point data.

In the embodiment, the execution body may perform coordinate transformation on the auxiliary key point data to obtain the transformed auxiliary key point data. Specifically, the execution body may perform coordinate transformation on the auxiliary key point data with various methods. As an example, the execution body may determine a degree value for characterizing an opening degree of an eye indicated by the target eye image (for example, a ratio of a distance between eye key points for characterizing a center point at an edge of an upper eyelid and a center point at an edge of a lower eyelid with respect to a distance between eye key points for characterizing a left canthus and a right canthus), and search for a coefficient corresponding to the determined degree value from a preset correspondence table for characterizing a correspondence between the degree value and coefficient for performing coordinate transformation on the auxiliary key point data, and perform coordinate transformation on a coordinate in the auxiliary key point data based on the coefficient (for example, by multiplying the ordinate and the abscissa in the auxiliary key point data by a corresponding coefficient), to obtain the transformed auxiliary key point data.

In step 204, a to-be-inserted image is acquired, and the to-be-inserted image is inserted into a region in the target eye image that is characterized by the transformed auxiliary key point data and the eye key point data.

In the embodiment, the execution body may first acquire the to-be-inserted image remotely or locally. The to-be-inserted image may be an image to be inserted into the target eye image. For example, the to-be-inserted image may be an eyelash image, an eye makeup image, or the like.

Then, the execution body may insert the to-be-inserted image into the region in the target eye image that is characterized by the transformed auxiliary key point data and the eye key point data. Specifically, the region characterized by the transformed auxiliary key point data and the eye key point data may be an image region formed by the transformed auxiliary key point and the eye key point of the target eye image. For example, assuming that the to-be-inserted image is an eyelash image, an image region with a smallest area that includes the transformed auxiliary key point and the eye key point indicates the region into which the to-be-inserted image is inserted.

Figure 4:
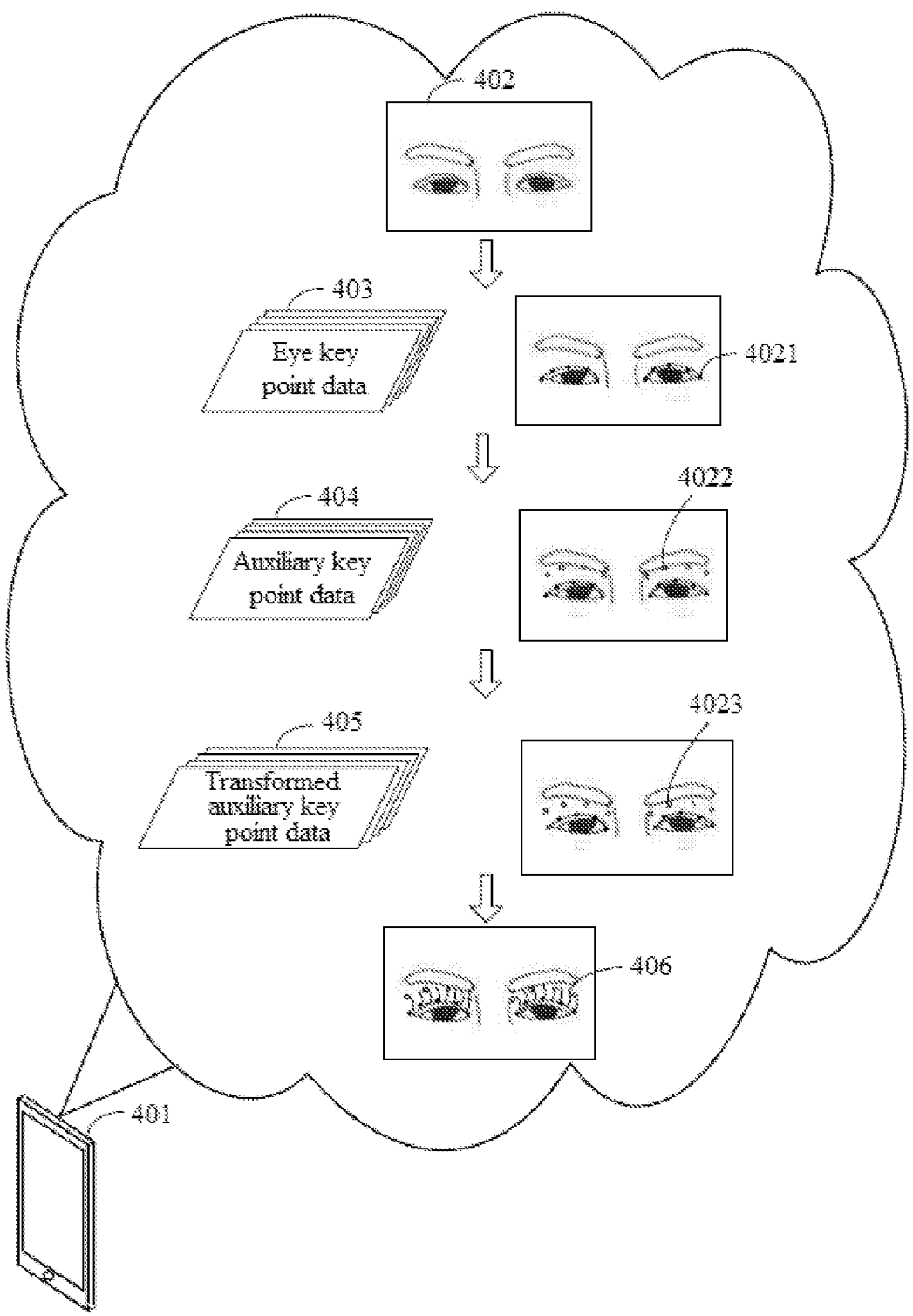
FIG. 4 is a schematic diagram of an application scenario of a method for inserting an image according to an embodiment of the present disclosure.

Reference is made to FIG. 4, which is a schematic diagram of an application scenario of a method for inserting an image according to the embodiment. In the application scenario of FIG. 4, a terminal device 401 first captures an eye image of a user as a target eye image 402. Then, the terminal device 401 obtains eye key point data 403 of the target eye image 402 with the pre-trained eye key point extracting model. The eye key point data is used to characterize a location of an eye key point 4021 of the target eye image in the target eye image, including a coordinate of the characterized eye key point in the target eye image 402. Then, the terminal device 401 adds a preset number of auxiliary key points 4022 above an edge of an upper eyelid for characterizing an eye based on a distance between the auxiliary key points and a distance between the auxiliary key point and the eye key point that are preset by a technician, and determines auxiliary key point data 404. The auxiliary key point data 404 is used to characterize a location of an auxiliary key point in the target eye image 402, including a coordinate of the characterized auxiliary key point in the target eye image 402. Then, the terminal device 401 may determine the ratio of the distance between eye key points for characterizing the center point at an edge of an upper eyelid and the center point at an edge of a lower eyelid with respect to the distance between eye key points for characterizing a left canthus and a right canthus as a degree value for characterizing an opening degree of the eye indicated by the target eye image 402. The terminal device 401 further search for the coefficient corresponding to the determined degree value from the preset correspondence table for characterizing a correspondence between the degree value and coefficient for performing coordinate transformation on the auxiliary key point data, and perform coordinate transformation on a coordinate in the auxiliary key point data based on the coefficient, to obtain the transformed auxiliary key point data 405 for characterizing a location of the transformed auxiliary key point 4023 in the target eye image 402. Finally, the terminal device 401 acquires a to-be-inserted image 406 (for example, an eyelash image), and inserts the to-be-inserted image 406 into a region where the transformed auxiliary key point and the eye key point are located.

With the method according to the embodiment of the present disclosure, the eye key point data of the acquired target eye image is determined, the auxiliary key point data of the target eye image is determined based on the eye key point data, and coordinate transformation is performed on the auxiliary key point data to obtain the transformed auxiliary key point data, finally, the preset image is deformed based on the transformed auxiliary key point data, and the deformed preset image is inserted into a corresponding location in the target eye image. Therefore, the flexibility of inserting a preset image into an eye image is improved, which enriches the display form of the preset image inserted into the eye image.

Figure 5:
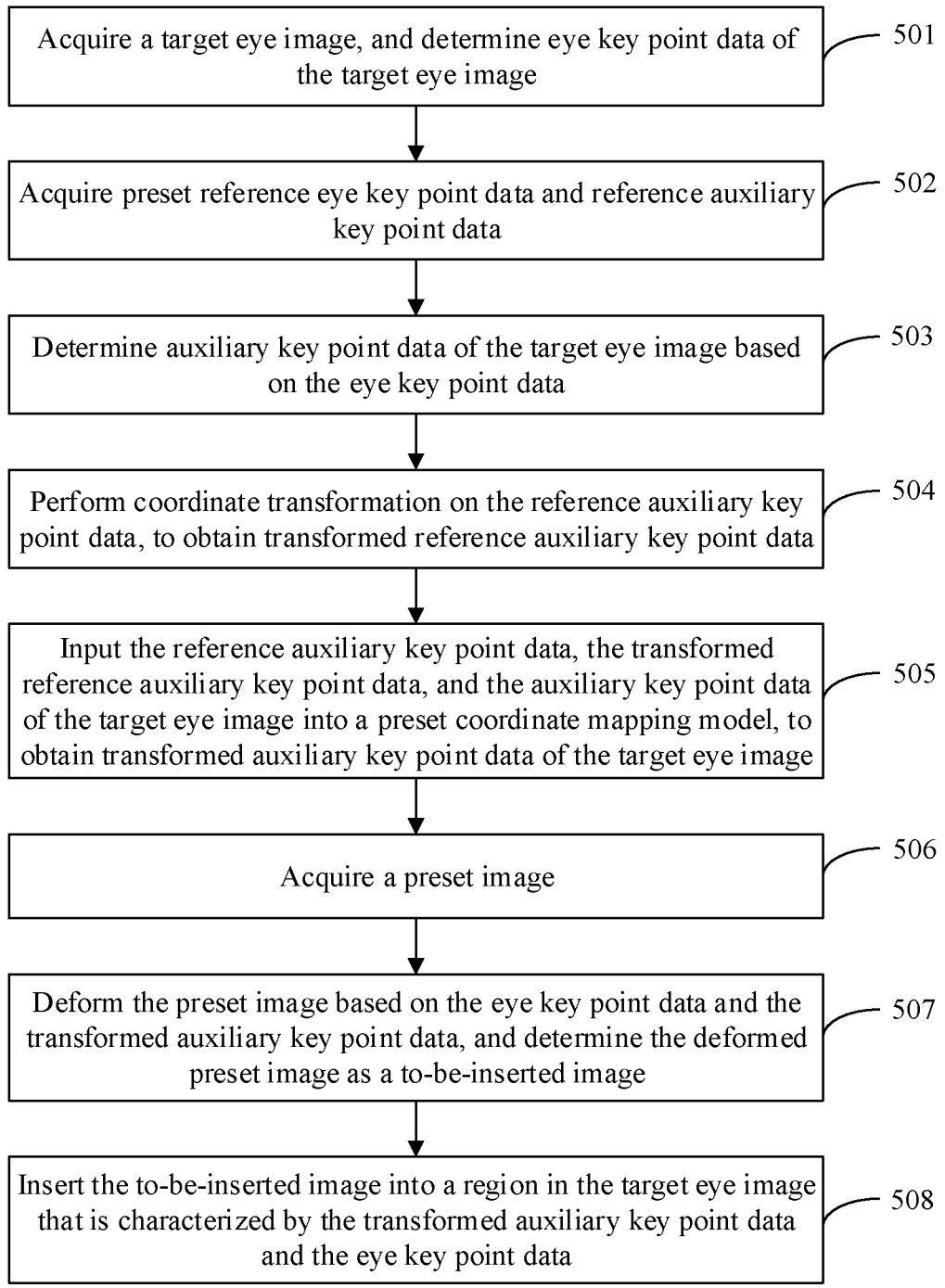
FIG. 5 is a flow chart of a method for inserting an image according to another embodiment of the present disclosure.

Reference is made to FIG. 5, which shows a flow 500 of a method for inserting an image according to another embodiment. The flow 500 of the method for inserting an image includes the following steps 501 to 508.

In step 501, a target eye image is acquired, and eye key point data of the target eye image is determined.

In the embodiment, step 501 is substantially the same as step 201 in the embodiment corresponding to FIG. 2, which is not repeated herein.

In step 502, preset reference eye key point data and reference auxiliary key point data are acquired.

In the embodiment, an execution body of the method for inserting an image (for example, the server or the terminal devices shown in FIG. 1) may acquire preset reference eye key point data and reference auxiliary key point data remotely or locally in a wired connection manner or a wireless connection manner. The reference eye key point data is used to characterize a location of a eye key point of a reference eye image preset in the reference eye image, and the reference auxiliary key point data is used to characterize a location of a reference auxiliary key point preset in the reference eye image. Specifically, the reference eye key point data may be eye key point data of the reference eye image determined with the eye key point extracting model listed in step 201. The auxiliary key point characterized by the reference auxiliary key point data may be a point manually set by a technician, or a point set by the execution body based on a preset distance between the auxiliary key points and/or a preset distance between the auxiliary key point and the reference eye key point.

In step 503, auxiliary key point data of the target eye image is determined based on the eye key point data.

In the embodiment, step 503 is substantially the same as step 202 in the embodiment corresponding to FIG. 2, which is not repeated herein.

In step 504, coordinate transformation is performed on the reference auxiliary key point data to obtain transformed reference auxiliary key point data.

In the embodiment, the execution body may perform coordinate transformation on the reference auxiliary key data with various methods to obtain the transformed reference auxiliary key point data. As an example, the execution body may determine a degree value for characterizing an opening degree of an eye indicated by the target eye image (for example, a ratio of a distance between eye key points for characterizing a center point at an edge of an upper eyelid and a center point at an edge of a lower eyelid with respect to a distance between eye key points for characterizing a left canthus and a right canthus), and search for a coefficient corresponding to the determined degree value from a preset correspondence table for characterizing a correspondence between the degree value and coefficient for performing coordinate transformation on the auxiliary key point data, and perform coordinate transformation on a coordinate in the auxiliary key point data based on the coefficient (for example, by multiplying the ordinate and the abscissa in the auxiliary key point data by a corresponding coefficient), to obtain the transformed auxiliary key point data.

In some alternative implementations of the embodiment, the execution body may perform coordinate transformation on the reference auxiliary key point data according to the following steps to obtain the transformed reference auxiliary key point data.

Figure 6:
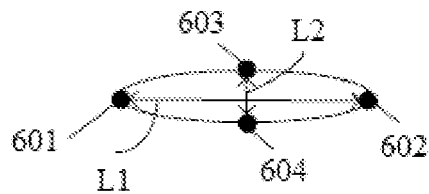
FIG. 6 is an exemplary schematic diagram of a step of determining an opening degree value based on eye key point data with a method for inserting an image according to an embodiment of the present disclosure.

First, an opening degree value for characterizing an opening degree of an eye indicated by the target eye image is determined based on the eye key point data of the target eye image. Specifically, the opening degree value may indicate the ratio of a distance between eye key points for characterizing a center point at an edge of an upper eyelid and a center point at an edge of a lower eyelid of the eye with respect to a distance between eye key points for characterizing a left canthus and a right canthus. As shown in FIG. 6, points 601 and 602 indicate eye key points for characterizing canthus, and points 603 and 604 indicate eye key points for characterizing center points at edges of the upper and lower eyelid, and L1 indicates a distance between the point 601 and the point 602, and L2 indicates a distance between the point 603 and the point 604, the opening degree value may be calculated as L2/L1. It is to be noted that the opening degree value may be a value calculated based on an eye key point of any eye image in the target eye image, or may be an average value calculated based on an eye key point of each eye image of two eye images, which is not limited herein.

Then, the radians value for characterizing the change amount of the coordinate in the reference auxiliary key point data is determined based on a preset radians calculating equation and the abscissa in the reference auxiliary key point data. Specifically, the execution body may perform calculation on the abscissa in the reference auxiliary key point data according to the radians calculating equation, and determine a calculation result as the radians value, where the abscissa may be in a coordinate system established based on the reference eye image. For example, an upper left corner of the reference eye image is set as a coordinate origin, the horizontal direction represents a horizontal axis, and the vertical direction represents a vertical axis. As an example, the radians calculating equation may be represented as follows:

$$r=(x/w-0.5)\times 2\times m \quad (1)$$

where r indicates the radians value, x indicates the abscissa in the reference auxiliary key data, w indicates a lateral length of the reference eye image, and m indicates a preset adjustment coefficient. It can be seen from equation (1) that a small distance between the reference auxiliary key point and a lateral center point of the reference eye image corresponds to a small r, and vice versa.

Finally, the transformed reference auxiliary key point data is determined based on the radians value and the opening degree value. As an example, the execution body may obtain an ordinate in the transformed reference key point data according to the following equation:

$$y'=[1-(1-y/h)\times\cos(r)\times d]\times h \quad (2)$$

where y' indicates the ordinate in the transformed reference auxiliary key point data, y indicates an ordinate in the reference auxiliary key point data, h indicates a longitudinal width of the reference eye image, r indicates the calculated radians value, and d indicates the opening degree value. It can be seen from the above equation that when an eyelid of an eye characterized by an actually detected target eye image is moving, the opening degree value may be calculated in real time, and then coordinate transformation may be performed on the reference auxiliary key point data of the reference eye image, to obtain the transformed reference auxiliary key point data.

The execution body may use the abscissa in the reference auxiliary key point data as the abscissa in the transformed reference auxiliary key point data, that is, the abscissa remains unchanged. Alternatively, the execution body may obtain the abscissa in the transformed reference key point data according to the following equation:

$$x'=[x/w\times(1-\sin(r))\times d]\times w \quad (3)$$

where x' indicates the abscissa in the transformed reference auxiliary key point data, x indicates an abscissa in the reference auxiliary key point data, w indicates a lateral length of the reference eye image, r indicates the calculated radians value, and d indicates the opening degree value.

It is to be noted that the upper left corner of the reference eye image represents the coordinate origin of the abscissa and the ordinate in the equations (1) to (3), and when the upper left corner of the reference eye image no longer represents the coordinate origin, the equations (1) to (3) may be adjusted accordingly. For example, when the lower left corner of the reference eye image represents the coordinate origin, the equation (2) may be adjusted into the following form:

$$y'=y\times\cos(r)\times d.$$

By performing the steps in this implementation, the transformed reference auxiliary key point data may be calculated in real time when the eye characterized by the target eye image is performing a blinking action, and different degrees of coordinate transformation are performed on the reference auxiliary key point data for different locations, to facilitate real-time adjustment of the shape of an image inserted into the target eye image based on the transformed reference auxiliary key point data, such that the display effect of the image (for example, an eyelash image) inserted into the target eye image is enriched (for example, the stereoscopic effect is strong).

In step 505, the reference auxiliary key point data, the transformed reference auxiliary key point data, and the auxiliary key point data of the target eye image are inputted into a preset coordinate mapping model, to obtain the transformed auxiliary key point data of the target eye image.

In the embodiment, the execution body may input the reference auxiliary key point data, the transformed reference auxiliary key point data, and the auxiliary key point data of the target eye image into the preset coordinate mapping model to obtain the transformed auxiliary key point data of the target eye image. The coordinate mapping model is used to characterize a correspondence of the transformed auxiliary key point data of the target eye image with respect to the reference auxiliary key point data, the transformed reference auxiliary key point data, and the auxiliary key point data of the target eye image.

As an example, the coordinate mapping model may be a calculating equation preset by a technician. According to the calculating equation, the execution body may calculate change amounts of the abscissas and the ordinates in the reference auxiliary key point data and the transformed reference auxiliary key point data, and perform coordinate transformation on the abscissa and the ordinate in the auxiliary key point data of the target eye image based on the calculated change amounts (for example, the change amount of the abscissa and the change amount of the ordinate are respectively add with the abscissa and the ordinate in the auxiliary key point data of the target eye image; or, the change amount of the abscissa and the change amount of the ordinate are respectively multiplied by a preset coefficient to obtain an intermediate change amount, and then the intermediate change amount is added with the abscissa and the ordinate in the auxiliary key point data of the target eye image), to obtain the transformed auxiliary key point data of the target eye image.

In some alternative implementations of the embodiment, the coordinate mapping model may be a model constructed based on the moving least squares (MLS) method. The moving least squares method is a curve fitting method, which has a good fitting effect on a large amount of data. The above coordinate mapping model may perform fitting and calculation on inputted reference auxiliary key point data and the transformed reference auxiliary key point data with the moving least squares method, to obtaining parameters of a fitting equation. Then, the coordinate mapping model may calculate the auxiliary key point data of the inputted target eye image with the fitting equation, to obtain the transformed auxiliary key point data of the target eye image. It is to be noted that the moving least squares method is a well-known technique widely studied and applied at present, and the fitting process and the fitting equation for the moving least squares method are not described herein.

In step 506, a preset image is acquired.

In the embodiment, the execution body may acquire the preset image. The preset image may be various types of images, such as an eyelash image, an eye makeup image. For example, the preset image may be an image extracted from the reference eye image at a region where the reference eye key point and the reference auxiliary key point is located. For example, the preset image may be an eyelash image preset in the reference eye image.

In step 507, the preset image is deformed based on the eye key point data and the transformed auxiliary key point data, and the deformed preset image is determined as a to-be-inserted image.

In the embodiment, the execution body may deform the preset image based on the eye key point data and the transformed auxiliary key point data. Generally, since the shape and size of the preset image do not match the shape and size of the target eye image, it is required to deform the preset image to have a shape and a size that match the shape and size of the target eye image. In this implementation, the execution body may deform the preset image with various conventional methods. For example, the execution body may determine a polygon (for example, a rectangle, a trapezoid) including an eye key point and an auxiliary key point of the target eye image, which has the same shape as the preset image, and scaling the preset image based on a scale relationship between shapes of the polygon and the preset image, to obtain the deformed preset image.

As another example, the execution body may construct a first triangulation mesh based on the reference eye key point and the reference auxiliary key point of the reference eye image, and construct a second triangulation mesh based on the eye key point and the auxiliary key point of the target eye image. The coverage of the first triangulation mesh is the same as a display range of the preset image, and triangles in the first triangulation mesh respectively correspond to triangles in the second triangulation mesh. For each triangle in the first triangulation mesh, the execution body may deform an image region covered by the triangle to have the shape of a corresponding triangle in the second triangulation mesh. Further, a combination region of the deformed image regions of the triangles is determined as the to-be-inserted image.

In step 508, the to-be-inserted image is inserted into a region in the target eye image that is characterized by the transformed auxiliary key point data and the eye key point data.

In the embodiment, step 508 is substantially the same as the step of inserting the to-be-inserted image into the target eye image as described in step 204 in the embodiment corresponding to FIG. 2, which is not repeated herein.

As can be seen from FIG. 5, compared with the embodiment corresponding to FIG. 2, in the flow 500 of the method for inserting an image in this embodiment, the step of performing coordinate transformation on the auxiliary key point data of the target eye image based on the reference auxiliary key data is emphasized. Therefore, with the solution described in this embodiment, the transformed auxiliary key point data of the target eye image can be obtained by using the reference auxiliary key point data of the reference eye image, thereby further improving the flexibility of inserting an image, thus enriching the display effect of the inserted image.

Figure 7:
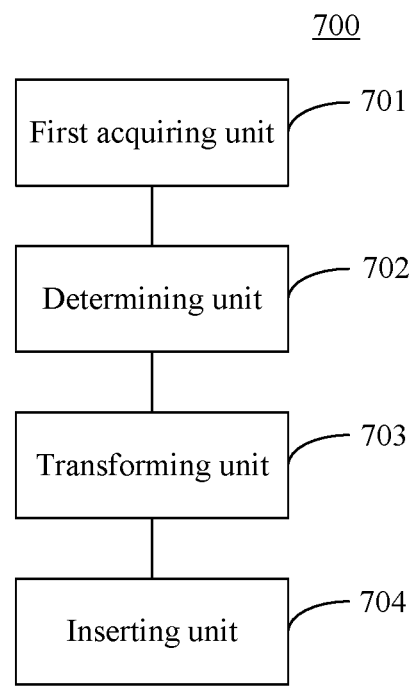
FIG. 7 is a schematic structural diagram of a device for inserting an image according to an embodiment of the present disclosure.

Reference is made to FIG. 7, in an implementation of the method shown in the drawings, a device for inserting an image is further provided according to an embodiment of the present disclosure. This device embodiment corresponds to the method embodiment shown in FIG. 2, and the device may be applied to various electronic devices.

As shown in FIG. 7, in the embodiment, a device 700 for inserting an image includes a first acquiring unit 701, a determining unit 702, a transforming unit 703 and an inserting unit 704. The first acquiring unit 701 is configured to acquire a target eye image, and determine eye key point data of the target eye image, where the eye key point data characterizes a location of an eye key point of the target eye image in the target eye image. The determining unit 702 is configured to determine auxiliary key point data of the target eye image based on the eye key point data, where the auxiliary key point data characterizes a location of an auxiliary key point of the target eye image in the target eye image. The transforming unit 703 is configured to perform coordinate transformation on the auxiliary key point data, to obtain transformed auxiliary key point data. The inserting unit 704 is configured to acquire a to-be-inserted image, and insert the to-be-inserted image into a region in the target eye image that is characterized by the transformed auxiliary key point data and the eye key point data.

In the embodiment, the first acquiring unit 701 may first acquire a target eye image remotely or locally in a wired connection manner or a wireless connection manner. The target eye image may be an image including an eye image of a target person (for example, a user or another person who uses the terminal device as shown in FIG. 1). For example, the target eye image may be an image obtained by capturing an eye of a target person, or may be an eye image extracted from a face image for characterizing the face of the target person. It is to be noted that the target eye image may be a single image, or an eye image in an image frame extracted from a target video. For example, the target eye image may be an eye image in a currently displayed image frame in a video played by the device 700.

Then, the first acquiring unit 701 may determine the eye key point data of the target eye image. The eye key point data is used to characterize a location of an eye key point of the target eye image in the target eye image. Generally, the eye key point data may include a coordinate in a coordinate system established in advance in the target eye image, and the location of the eye key point may be determined in the target eye image based on the coordinate. The eye key point may be a point for characterizing a specific location in the eye image (for example, a point for characterizing a canthus, a point for characterizing an edge of an eyelid).

In the embodiment, the first acquiring unit 701 may determine the eye key point data of the target eye image with various conventional methods for determining an eye key point. For example, the first acquiring unit 701 may input the target eye image into a pre-trained eye key point extracting model to obtain the eye key point data.

In the embodiment, the determining unit 702 may determine the auxiliary key point data of the target eye image based on the eye key point data determined by the first acquiring unit 701. The auxiliary key point data is used to characterize a location of an auxiliary key point of the target eye image in the target eye image. The auxiliary key point may be a key point added in the target eye image by the determining unit 702 for characterizing, in combination with the eye key point data, a region in the target eye image into which another image is inserted.

Specifically, the determining unit 702 may determine the auxiliary key point data of the target eye image with various methods. For example, the determining unit 702 may add the auxiliary key point within a preset range (for example, a range determined by a preset distance above an eye key point for characterizing an edge of an upper eyelid and an eye key point for characterizing a canthus) of the target eye image based on data preset by a technician, and determine the auxiliary key point data. The preset data includes, but is not limited to, at least one of a distance between auxiliary key points, a distance between the auxiliary key point and the eye key point.

In this embodiment, the transforming unit 703 may perform coordinate transformation on the auxiliary key point data to obtain the transformed auxiliary key point data. Specifically, the transforming unit 703 may perform coordinate transformation on the auxiliary key point data with various methods. As an example, the transforming unit 703 may determine a degree value for characterizing an opening degree of an eye indicated by the target eye image (for example, a ratio of a distance between eye key points for characterizing a center point at an edge of an upper eyelid and a center point at an edge of a lower eyelid with respect to a distance between eye key points for characterizing a left canthus and a right canthus), and search for a coefficient corresponding to the determined degree value from a preset correspondence table for characterizing a correspondence between the degree value and coefficient for performing coordinate transformation on the auxiliary key point data, and perform coordinate transformation on a coordinate in the auxiliary key point data based on the coefficient (for example, by multiplying the ordinate and the abscissa in the auxiliary key point data by a corresponding coefficient), to obtain the transformed auxiliary key point data.

In the embodiment, the inserting unit 704 may first acquire the to-be-inserted image remotely or locally. The to-be-inserted image may be an image to be inserted into the target eye image. For example, the to-be-inserted image may be an eyelash image, an eye makeup image, or the like.

Then, the inserting unit 704 may insert the to-be-inserted image into the region in the target eye image that is characterized by the transformed auxiliary key point data and the eye key point data. Specifically, the region characterized by the transformed auxiliary key point data and the eye key point data may be an image region formed by the transformed auxiliary key point and the eye key point of the target eye image. For example, assuming that the to-be-inserted image is an eyelash image, an image region with a smallest area that includes the transformed auxiliary key point and the eye key point indicates the region into which the to-be-inserted image is inserted.

In some alternative implementations of the embodiment, the device 700 may further include a second acquiring unit (not shown in FIG. 7). The second acquiring unit is configured to acquire preset reference eye key point data and reference auxiliary key point data, where the reference eye key point data characterizes a location of an eye key point of a reference eye image preset in the reference eye image, and the reference auxiliary key point data characterizes a location of a reference auxiliary key point preset in the reference eye image.

In some alternative implementations of the embodiment, the determining unit 702 may include a constructing module (not shown in FIG. 7), a first determining module (not shown in FIG. 7), and a second determining module (not shown in FIG. 7). The constructing module is configured to construct a first triangulation mesh based on the reference auxiliary key point data and the reference eye key point data. The first determining module is configured to determine a second triangulation mesh on the target eye image based on a side length and an inner angle of a triangle in the first triangulation mesh and a correspondence between the eye key point data of the target eye image and the reference eye key point data. The second determining module is configured to determine a target vertex from vertexes of a triangle in the second triangulation mesh, and determine the auxiliary key point data of the target eye image based on a location of the target vertex in the target eye image.

In some alternative implementations of the embodiment, the transforming unit 703 may include a transforming module (not shown in FIG. 7) and a generating module (not shown in FIG. 7). The transforming module is configured to perform coordinate transformation on the reference auxiliary key point data, to obtain transformed reference auxiliary key point data. The generating module is configured to input the reference auxiliary key point data, the transformed reference auxiliary key point data, and the auxiliary key point data of the target eye image into a preset coordinate mapping model, to obtain the transformed auxiliary key point data of the target eye image.

In some alternative implementations of the embodiment, the transforming module may include a first determining submodule (not shown in FIG. 7), a second determining submodule (not shown in FIG. 7) and a third determining submodule (not shown in FIG. 7). The first determining submodule is configured to determine, based on the eye key point data of the target eye image, an opening degree value for characterizing an opening degree of an eye indicated by the target eye image. The second determining submodule is configured to determine, based on a preset radians calculating equation and an abscissa in the reference auxiliary key point data, a radians value for characterizing a change amount of a coordinate in the reference auxiliary key point data. The third determining submodule is configured to determine, based on the radians value and the opening degree value, the transformed reference auxiliary key point data.

In some alternative implementations of the embodiment, the coordinate mapping model is constructed based on a moving least squares MLS method.

In some alternative implementations of the embodiment, the inserting unit 704 may include an acquiring module (not shown in FIG. 7) and a deforming module (not shown in FIG. 7). The acquiring module is configured to acquire a preset image. The deforming module is configured to deform the preset image based on the eye key point data and the transformed auxiliary key point data, and determine the deformed preset image as the to-be-inserted image.

With the device for inserting an image according to the embodiment of the present disclosure, the eye key point data of the acquired target eye image is determined, the auxiliary key point data of the target eye image is determined based on the eye key point data, and coordinate transformation is performed on the auxiliary key point data to obtain the transformed auxiliary key point data, finally, the preset image is deformed based on the transformed auxiliary key point data, and the deformed preset image is inserted into a corresponding location in the target eye image. Therefore, the flexibility of inserting a preset image into an eye image is improved, which enriches the display form of the preset image inserted into the eye image.

Figure 8:
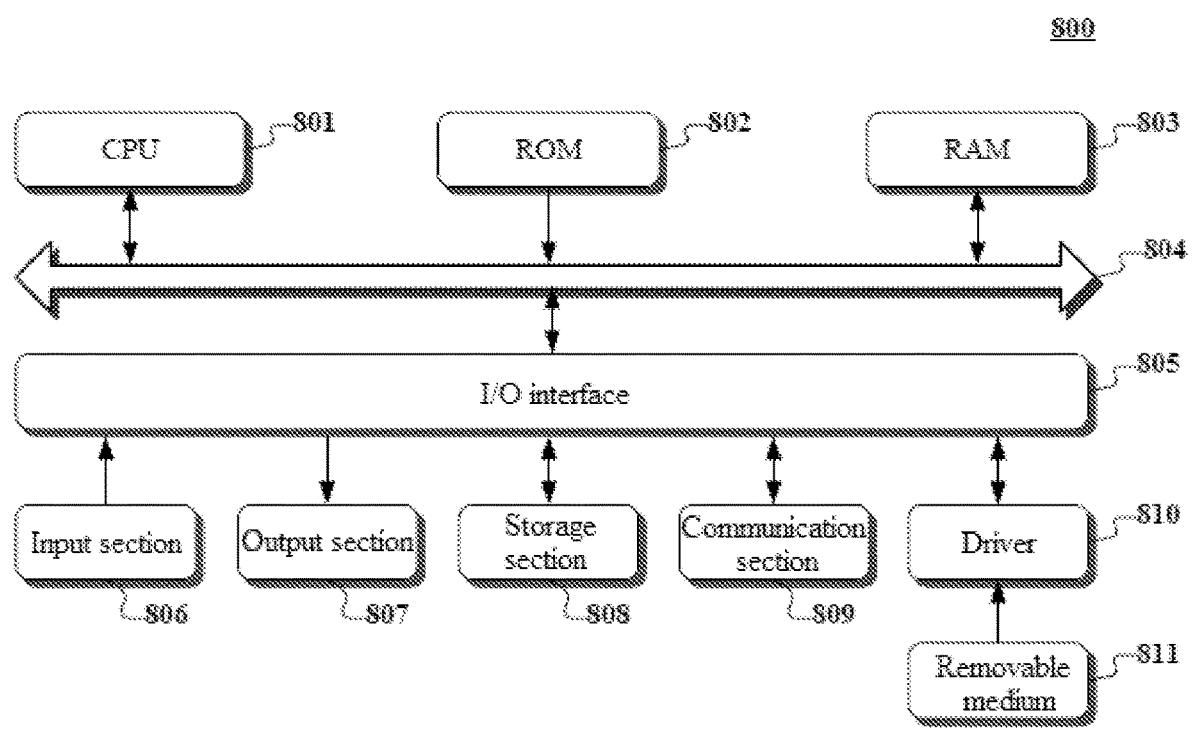
FIG. 8 is a schematic structural diagram of a computer system of an electronic device applicable for implementing an embodiment of the present disclosure.

Reference is made to FIG. 8, which is a schematic structural diagram of a computer system 800 of an electronic device (for example, the server or terminal device as shown in FIG. 1) applicable for implementing an embodiment of the present disclosure. The electronic device shown in FIG. 8 is merely an example, which should not impose any limitation on the function and usage scope of the embodiments of the present disclosure.

As shown in FIG. 8, the computer system 800 includes a central processing unit (CPU) 801. The CPU 801 executes various processes according to a program stored in a read only memory (ROM) 802 or a program loaded from a storage section 808 to a random access memory (RAM) 1003. In the RAM 803, various programs and data required by system 800 to execute various processing is also stored as necessary. The CPU 801, the ROM 802 and the RAM 803 are connected with each other via a bus 804. An input/output (I/O) interface 805 is also connected to the bus 804.

The following sections are connected to the I/O interface 805: an input section 806 including a keyboard, a mouse and the like; an output section 807 including displays such as a cathode ray tube (CRT), a liquid crystal display (LCD), a loudspeaker and the like; a memory section 808 including hard disc and the like; and a communication section 809 including a network interface card such as a LAN card, a modem and the like. The communication section 809 performs communication processing via a network such as the Internet. A driver 810 may also be connected to the I/O interface 805 as needed. A removable medium 811, such as a magnetic disk, an optical disk, an magneto optical disk, a semiconductor memory, may be installed on the driver 810 as needed, so that a computer program read therefrom is installed into the storage portion 808 as needed.

Specifically, according to an embodiment of the present disclosure, the processes described above with reference to the flowchart may be implemented by a computer software program. For example, a computer program product is provided in an embodiment of the present disclosure, which includes a computer program embodied on a computer readable medium. The computer program includes program codes for performing the method shown in the flowchart. In this embodiment, the computer program may be downloaded and installed from the network via the communication section 809, and/or installed from the removable medium 811. When the computer program is executed by the central processing unit (CPU) 801, the above functions defined in the method of the present disclosure are performed.

It is to be noted that the computer readable medium described in the present disclosure may be a computer readable signal medium or a computer readable medium or any combination of the above. The computer readable medium may be, for example, but not limited to, an electronic, magnetic, optical, electromagnetic, infrared, or semiconductor system, apparatus or device, or any combination of the above. More specifically, an example of computer readable medium may include, but is not limited to, an electrical connection having one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the above. In the present disclosure, the computer readable medium may be any tangible medium that contains or stores a program, which may be used by or in connection with an instruction execution system, apparatus or device. In the present disclosure, the computer readable signal medium may include a data signal that is propagated in a baseband or as a part of a carrier, in which computer readable program codes are carried. Such propagated data signal may have various forms, including, but not limited to, an electromagnetic signal, an optical signal, or any suitable combination of the above. The computer readable signal medium may also be any computer readable medium other than the computer readable medium, which may transmit, propagate or transport a program used by or in connection with an instruction execution system, apparatus or device. Program codes contained in the computer readable medium may be transmitted by any suitable medium, including, but not limited to, wireless signals, a wire, a fiber optic cable, RF, or any suitable combination of the above.

The computer program codes for performing the operations of the present disclosure may be written in one or more programming languages, or a combination thereof, which include an object oriented programming language such as Java, Smalltalk, C++, and a conventional procedural programming language such as the "C" language or a similar programming language. The program codes may be executed entirely on a user's computer, partly on the user's computer, as a stand-alone software package, partly on the user's computer and partly on a remote computer, or entirely on the remote computer or a server. In the case of a remote computer, the remote computer may be connected to the user's computer through any kind of network, including a local area network (LAN) or a wide area network (WAN), or the remote computer may be connected to an external computer (for example, through the by the Internet service provider).

The flowchart and block diagrams in the drawings illustrate the system architecture, functionality and operations of possible implementations of the systems, methods and computer program products according to the embodiments of the present disclosure. In this regard, each block of the flowchart or block diagram may represent a module, a program segment, or a portion of the codes that includes one or more executable instructions for implementing the specified the logic functions. It is also to be noted that in some alternative implementations, the functions noted in the blocks may also implemented in a different order than that shown in the drawings. For example, two successively represented blocks may be executed substantially in parallel, or may be executed in a reverse order, depending on the functionality involved. It is also to be noted that each block in the block diagrams and/or flowcharts, and combinations of blocks in the block diagrams and/or flowcharts may be implemented in a dedicated hardware-based system that performs specified functions or operations, or may be implemented by a combination of dedicated hardware and computer instructions.

The units involved in the embodiments of the present disclosure may be implemented by software or by hardware. The described units may also be arranged in a processor, which may be described, for example, as a processor including a first acquiring unit, a determining unit, a transforming unit and an inserting unit. Names of the units do not constitute a limitation on the unit itself in some cases. For example, the first acquiring unit may also be described as "a unit configured to acquire a target eye image, and determine eye key point data of the target eye image".

In another aspect, a computer readable medium is further provided according to the present disclosure, which may be included in the electronic device described in the above embodiments, or may be separately provided without being arranged in the electronic device. The computer readable medium carries one or more programs, which, when executed by the electronic device, cause the electronic device to: acquire a target eye image, and determining eye key point data of the target eye image, where the eye key point data characterizes a location of an eye key point of the target eye image in the target eye image; determine auxiliary key point data of the target eye image based on the eye key point data, where the auxiliary key point data characterizes a location of an auxiliary key point of the target eye image in the target eye image; perform coordinate transformation on the auxiliary key point data, to obtain transformed auxiliary key point data; and acquire a to-be-inserted image, and inserting the to-be-inserted image into a region in the target eye image that is characterized by the transformed auxiliary key point data and the eye key point data.

The above description only shows preferred embodiments of the present disclosure and a description of the principles of the applied technology. It is to be understood by those skilled in the art that the scope of the present disclosure is not limited to the technical solutions formed by specific combinations of the above technical features, and should include other technical solutions formed any arbitrarily combination of the above technical features and equivalent features thereof made without departing from the concept of the present disclosure, for example, a technical solution formed by replacing the above feature with (but is not limited to) a technical feature having the same function according to the present disclosure.

The invention claimed is:

1. A method for inserting an image, comprising:
   acquiring a target eye image, and determining eye key point data of the target eye image, wherein the eye key point data indicative of a location of at least one eye key point of the target eye image in the target eye image;
   adding a plurality of auxiliary key points to the target eye image based on predetermined data:
   determining an opening degree value indicative of an opening degree of an eye in the target eye image based on the eye key point data of the target eye image;
   determining a coefficient based at least in part on the opening degree value;
   performing coordinate transformation on the plurality of auxiliary key points based at least in part on the coefficient to obtain transformed auxiliary key point data;
   determining a region of the target eye image based on the eye key point data and the transformed auxiliary key point data;
   acquiring a to-be-inserted image; and
   inserting the to-be-inserted image into the region of the target eye image.

2. The method according to claim 1, wherein the predetermined data are associated with reference eye key point data and reference auxiliary key point data, and wherein the method further comprises:
   acquiring preset reference eye key point data and reference auxiliary key point data, wherein the reference eye key point data characterizes a location of an eye key point of a reference eye image preset in the reference eye image, and the reference auxiliary key point data characterizes a location of a reference auxiliary key point preset in the reference eye image.

3. The method according to claim 2, further comprising:
   constructing a first triangulation mesh based on the reference auxiliary key point data and the reference eye key point data;
   determining a second triangulation mesh on the target eye image based on a side length and an inner angle of a triangle in the first triangulation mesh and a correspondence between the eye key point data of the target eye image and the reference eye key point data; and
   determining a target vertex from vertexes of a triangle in the second triangulation mesh, and determining the auxiliary key point data of the target eye image based on a location of the target vertex in the target eye image.

4. The method according to claim 2, further comprising:
   performing coordinate transformation on the reference auxiliary key point data, to obtain transformed reference auxiliary key point data; and
   inputting the reference auxiliary key point data, the transformed reference auxiliary key point data, and the auxiliary key point data of the target eye image into a preset coordinate mapping model, to obtain the transformed auxiliary key point data of the target eye image.

5. The method according to claim 4, wherein the performing coordinate transformation on the reference auxiliary key point data, to obtain transformed reference auxiliary key point data comprises:
   determining, based on a preset radians calculating equation and an abscissa in the reference auxiliary key point data, a radians value for characterizing a change amount of a coordinate in the reference auxiliary key point data; and
   determining, based on the radians value and the opening degree value, the transformed reference auxiliary key point data.

6. The method according to claim 4, wherein the coordinate mapping model is constructed based on a moving least squares MLS method.

7. The method according to claim 1, wherein the acquiring a to-be-inserted image comprises:
   acquiring a preset image; and
   deforming the preset image based on the eye key point data and the transformed auxiliary key point data, and determining the deformed preset image as the to-be-inserted image.

8. An electronic device comprising:
   one or more processors; and
   a storage device configured to store one or more programs thereon, wherein the one or more programs, when executed by the one or more processors, cause the one or more processors to perform operations, the operations comprising:
   acquiring a target eye image, and determining eye key point data of the target eye image, wherein the eye key point data indicative of a location of at least one eye key point of the target eye image in the target eye image;

adding a plurality of auxiliary key points to the target eye image based on predetermined data:

determining an opening degree value indicative of an opening degree of an eye in the target eye image based on the eye key point data of the target eye image;

determining a coefficient based at least in part on the opening degree value;

performing coordinate transformation on the plurality of auxiliary key points based at least in part on the coefficient to obtain transformed auxiliary key point data;

determining a region of the target eye image based on the eye key point data and the transformed auxiliary key point data;

acquiring a to-be-inserted image; and inserting the to-be-inserted image into the region of the target eye image.

9. The electronic device according to claim 8, wherein the predetermined data are associated with reference eye key point data and reference auxiliary key point data, and wherein the operations further comprise:

acquiring preset reference eye key point data and reference auxiliary key point data, wherein the reference eye key point data characterizes a location of an eye key point of a reference eye image preset in the reference eye image, and the reference auxiliary key point data characterizes a location of a reference auxiliary key point preset in the reference eye image.

10. The electronic device according to claim 9, wherein the operations further comprise:

constructing a first triangulation mesh based on the reference auxiliary key point data and the reference eye key point data;

determining a second triangulation mesh on the target eye image based on a side length and an inner angle of a triangle in the first triangulation mesh and a correspondence between the eye key point data of the target eye image and the reference eye key point data; and determining a target vertex from vertexes of a triangle in the second triangulation mesh, and determining the auxiliary key point data of the target eye image based on a location of the target vertex in the target eye image.

11. The electronic device according to claim 9, wherein the operations further comprise:

performing coordinate transformation on the reference auxiliary key point data, to obtain transformed reference auxiliary key point data; and inputting the reference auxiliary key point data, the transformed reference auxiliary key point data, and the auxiliary key point data of the target eye image into a preset coordinate mapping model, to obtain the transformed auxiliary key point data of the target eye image.

12. The electronic device according to claim 11, wherein the performing coordinate transformation on the reference auxiliary key point data, to obtain transformed reference auxiliary key point data comprises:

determining, based on a preset radians calculating equation and an abscissa in the reference auxiliary key point data, a radians value for characterizing a change amount of a coordinate in the reference auxiliary key point data; and determining, based on the radians value and the opening degree value, the transformed reference auxiliary key point data.

13. The electronic device according to claim 11, wherein the coordinate mapping model is constructed based on a moving least squares MLS method.

14. The electronic device according to claim 8, wherein the acquiring a to-be-inserted image comprises:

acquiring a preset image; and deforming the preset image based on the eye key point data and the transformed auxiliary key point data, and determining the deformed preset image as the to-be-inserted image.

15. A non-transitory computer readable medium comprising a computer program thereon, wherein the computer program, when executed by a processor, cause the processor to perform operations, the operations comprising:

acquiring a target eye image, and determining eye key point data of the target eye image, wherein the eye key point data indicative of a location of at least one eye key point of the target eye image in the target eye image;

adding a plurality of auxiliary key points to the target eye image based on predetermined data;

determining an opening degree value indicative of an opening degree of an eye in the target eye image based on the eye key point data of the target eye image;

determining a coefficient based at least in part on the opening degree value;

performing coordinate transformation on the plurality of auxiliary key points based at least in part on the coefficient to obtain transformed auxiliary key point data;

acquiring a to-be-inserted image; and inserting the to-be-inserted image into the region of the target eye image.

* * * * *